United States Patent (10) Patent No.: US 7,715,976 B1
Xiao et al. (45) Date of Patent: May 11, 2010

(54) EGR DETECTION VIA HUMIDITY DETECTION

(75) Inventors: Nian Xiao, Canton, MI (US); James Michael Kerns, Trenton, MI (US); Yi Ding, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/417,373

(22) Filed: Apr. 2, 2009

(51) Int. Cl.
*F02M 25/07* (2006.01)
*F02B 47/10* (2006.01)

(52) U.S. Cl. ............ 701/108; 123/406.48; 123/568.16; 123/568.22; 73/114.71; 73/114.74

(58) Field of Classification Search .................. 701/108; 123/406.44, 406.45, 406.48, 568.11, 568.16, 123/568.22; 73/114.71, 114.74
See application file for complete search history.

(56) References Cited

U.S. PATENT DOCUMENTS

| 4,168,683 | A | * | 9/1979 | Hata et al. ................... 123/704 |
| 5,089,113 | A | | 2/1992 | Logothetis et al. |
| 5,145,566 | A | | 9/1992 | Logothetis et al. |
| 6,062,204 | A | | 5/2000 | Cullen |
| 6,477,830 | B2 | * | 11/2002 | Takakura et al. ............... 60/277 |
| 6,647,972 | B2 | | 11/2003 | Sato et al. |
| 6,725,848 | B2 | | 4/2004 | Ramamurthy et al. |
| 6,823,268 | B2 | * | 11/2004 | Silvis et al. .................... 702/30 |
| 6,918,362 | B2 | * | 7/2005 | Cullen ..................... 123/90.15 |
| 6,948,475 | B1 | * | 9/2005 | Wong et al. .................. 123/299 |
| 7,292,929 | B2 | | 11/2007 | Durand |
| 7,389,771 | B2 | * | 6/2008 | Andrews et al. ........ 123/568.22 |
| 7,398,775 | B2 | * | 7/2008 | Cullen ......................... 123/677 |
| 2002/0011066 | A1 | * | 1/2002 | Takakura et al. ............... 60/277 |
| 2003/0136390 | A1 | * | 7/2003 | Ramamurthy et al. .. 123/568.22 |
| 2005/0021218 | A1 | * | 1/2005 | Bhargava et al. ............. 701/108 |
| 2005/0032232 | A1 | * | 2/2005 | Silvis et al. .................. 436/139 |
| 2005/0072404 | A1 | * | 4/2005 | Cullen ......................... 123/399 |
| 2007/0095328 | A1 | * | 5/2007 | Brehob .................. 123/406.47 |

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

Various systems and methods are described for controlling an engine in a vehicle which includes an exhaust passage and an exhaust gas recirculation system. One example method comprises adjusting an engine operating parameter based on an exhaust gas recirculation amount, the exhaust gas recirculation amount based on a first humidity and a second humidity, the first humidity generated from a first humidity sensor at a first location and the second humidity generated from a second humidity sensor located in the exhaust passage of the engine.

20 Claims, 4 Drawing Sheets

EGR DETECTION VIA HUMIDITY DETECTION

TECHNICAL FIELD

The present application relates to an exhaust gas recirculation (EGR) system for an engine in a motor vehicle.

BACKGROUND AND SUMMARY

Internal combustion engines may utilize exhaust gas recirculation (EGR) in order to reduce emissions such as nitrogen oxides ($NO_x$). Although EGR may be beneficial, an inaccurate determination of the amount of EGR may be detrimental to overall engine performance, resulting in increased emissions and decreased engine driveability.

One example approach for determining an amount of EGR is described in U.S. Pat. No. 5,145,566. In this example, EGR flow is determined based on humidity during conditions in which the engine is operating with a stoichiometric air-fuel ratio. Specifically, an exhaust gas sensor is employed to measure a relative amount of water vapor in an exhaust gas/intake air mixture as a relative amount of water in the exhaust gas/intake air mixture is dependent on the relative amount of EGR. Additionally, a second sensor is employed to determine a relative amount of water vapor in the air surrounding the vehicle (e.g., ambient water vapor). In this way, the amount of EGR may be accurately determined by adjusting the first measurement based on the relative amount of ambient water vapor.

During engine operation, however, the air-fuel ratio may fluctuate from stoichiometry (e.g., it may become lean or rich). Under such conditions, the relationship between exhaust gas recirculation and humidity changes due to variations in products of combustion. As such, the above method may produce an erroneous estimate of the amount of exhaust gas recirculation resulting in degraded engine performance including a loss of power and increased emissions. Further, the above method assumes a fuel of 100% gasoline and does not account for varying amounts of alcohol in the fuel (e.g., E85, which is 85% ethanol and 15% gasoline). Fuel blends comprising varying amounts of alcohol also affect the products of combustion which may lead to an inaccurate determination of exhaust gas recirculation when utilized by the above approach.

The inventors herein have recognized the above problems and have devised an approach to address them. Thus, in one example, a method for determining an amount of exhaust gas recirculation based on humidity with regard for variable parameters such as air-fuel ratio and fuel blend is disclosed. The method comprises determining an exhaust gas recirculation amount based on a first humidity generated from a first humidity sensor in an intake manifold of an engine and a second humidity generated from a second humidity sensor in an exhaust manifold of the engine. A third humidity sensor may also be positioned outside of the engine in order to generate an ambient humidity.

In this way, an accurate exhaust gas recirculation amount may be determined based on a balance of an ambient water mass and an exhaust water mass in the intake manifold. For example, an indication of the amount of exhaust gas in the intake air may be generated once the intake, exhaust, and ambient humidities are determined as the intake air may be composed of exhaust gas and ambient air. Therefore, accurate EGR amounts can be determined even when the combustion air-fuel ratio varies widely and/or the fuel type varies widely, since the EGR determination is based on an approach that has low sensitivity to these factors. After an accurate EGR amount is determined, various engine operating parameters may be adjusted in order to maintain or increase engine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for operating an engine in a motor vehicle wherein an engine control system is configured to adjust engine operating parameters in response to an amount of exhaust gas recirculation (EGR). An amount of EGR may be determined based on a plurality of humidity readings generated in a plurality of locations, with at least a first humidity sensor being located in an intake manifold and a second humidity sensor being located in an exhaust manifold. In such a configuration, indications of the water vapor concentration in the intake manifold and the exhaust manifold, as well as an ambient water vapor concentration, may be generated. The plurality of generated humidity indications may be utilized in a mass balance formula that may be applied to the intake air (a combination of ambient air and exhaust gas from the EGR system) in order to determine an accurate amount of EGR. Consequently, because a humidity sensor located in the exhaust manifold is employed to determine the exhaust gas humidity, an accurate indication of the EGR amount may be determined despite changes in air-fuel ratio and/or variations in the amount of alcohol in the fuel (e.g., for flex fuel vehicles).

Figure 1:
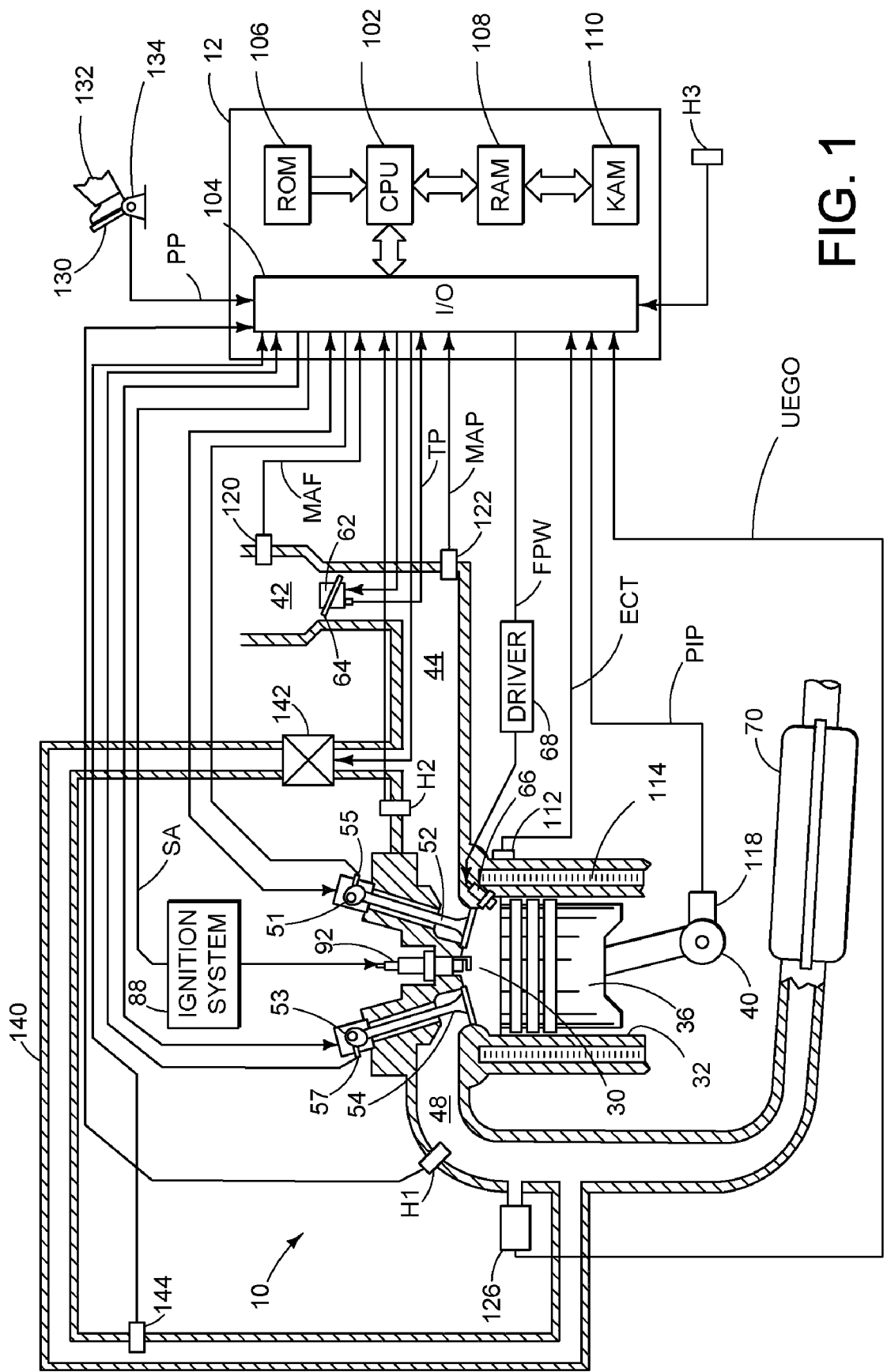
FIG. 1 shows a schematic diagram of a combustion chamber of an internal combustion engine.

FIG. 1 is a schematic diagram showing one cylinder of multi-cylinder engine 10, which may be included in a propulsion system of a vehicle, where in one example the vehicle is a flex fuel vehicle configured to operate on a range of fuels from E85 to 100% gasoline, for example. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more pressure, temperature, and concentration of the exhaust gas. In some examples, sensor 144 may provide one indication of an amount of EGR. The EGR amount may alternatively, or additionally, be determined from humidity readings and other operating parameters, as described in detail below. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below in FIGS. 2-4 as well as other variants that are anticipated but not specifically listed.

Engine 10 further includes a plurality of humidity sensors. The humidity sensors may detect a water vapor concentration in a variety of locations in the engine and may be combined with various other operating condition data to determine an amount of EGR, as well as various other operating parameters of the engine.

A first humidity sensor H1 is positioned in a first location in the intake manifold 44. The first location is downstream of the point where exhaust gas from the EGR system enters the intake manifold. As such, the humidity sensor H1 may detect the humidity of the air entering the combustion chamber 30

(hereinafter referred to as intake air). When the EGR valve 142 is open, the intake air contains both fresh air and exhaust gas and a generated humidity reading is indicative of the humidity of the combination of the two. In a condition in which the EGR valve 142 is closed, the intake air is comprised only of fresh air (e.g., ambient air), assuming no substantial amount of pushback or exhaustion of combustion products into the intake manifold past the intake valve; thus, the generated humidity reading is indicative of the humidity of the fresh air.

A second humidity sensor H2 is positioned in a second location in the exhaust manifold 48 which is upstream of the point where exhaust gas enters the EGR system. At this location, the second humidity sensor H2 generates a humidity reading indicative of the exhaust gas exiting the combustion chamber, assuming no substantial amount of blow-through gas from the intake manifold to the exhaust manifold during boosted positive valve overlap conditions, or at least when such conditions are not present.

A third humidity sensor H3 is positioned in a third location outside of the engine. In this location, the third humidity sensor generates a humidity reading indicative of the humidity of the fresh air (e.g., ambient air) outside of the engine. Although a third humidity sensor is depicted in FIG. 1, engine 10 may or may not include a third humidity sensor H3. In some embodiments, the third humidity sensor is not included as the first humidity sensor H1 may detect the ambient humidity during conditions in which the EGR valve is closed.

As described above, FIG. 1 shows only one cylinder of a multi-cylinder engine, and that each cylinder may similarly include its own set of intake/exhaust valves, fuel injector, spark plug, etc.

Figure 2:
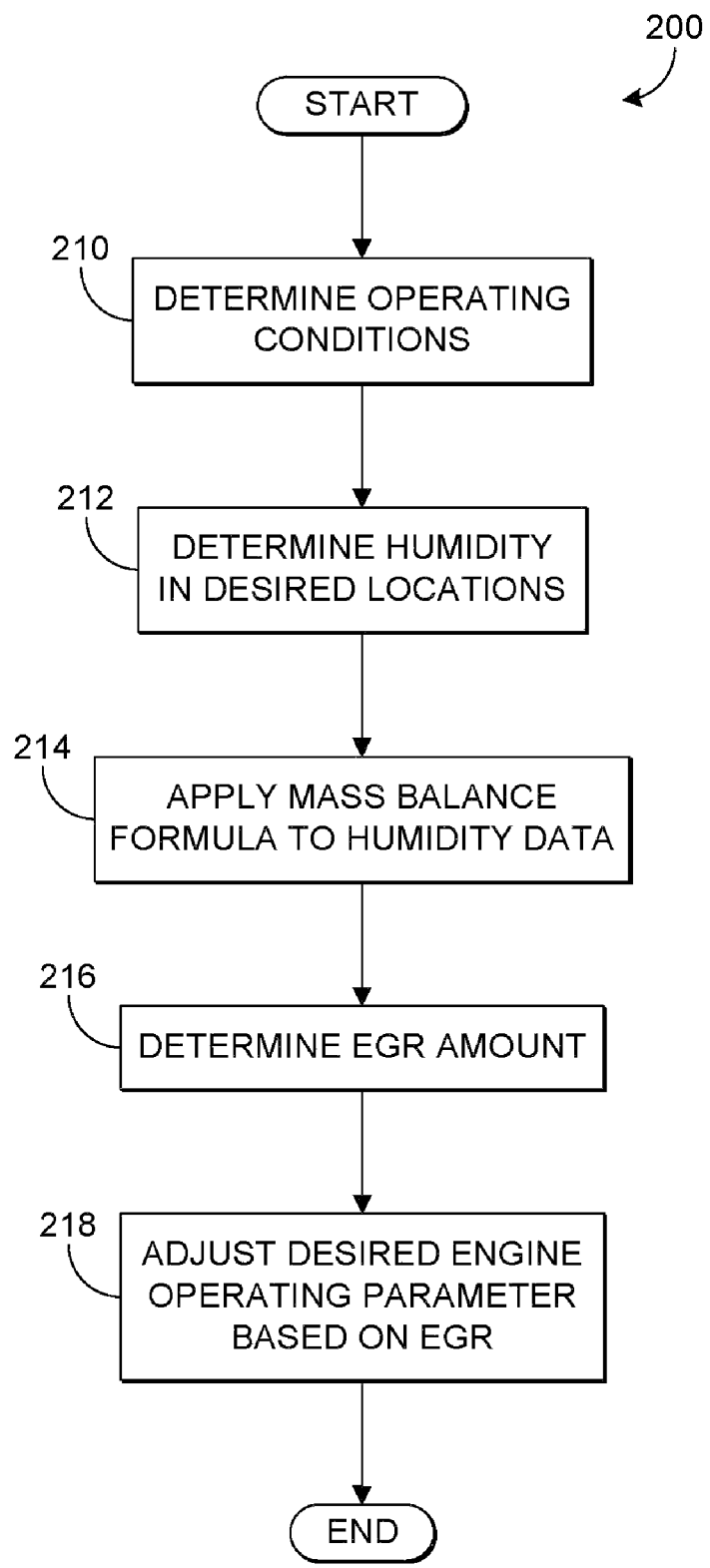
FIG. 2 shows a flow chart illustrating a routine for estimating an amount of EGR.

FIG. 2 illustrates a control system routine 200 for estimating an amount of exhaust gas recirculation (EGR). Specifically, the routine determines an amount of EGR based on a plurality of humidity readings generated by humidity sensors in a plurality of locations, including a humidity sensor in the intake manifold and a humidity sensor in the exhaust manifold. Since both the water vapor concentration of the ambient air and the water vapor concentration of the exhaust gas are determined, an accurate indication of the amount of EGR can be generated by utilizing a mass balance formula applied to the intake air, which may be a combination of ambient air and exhaust gas.

At 210 of routine 200, engine operating conditions are determined. Engine operating conditions may include, but are not limited to, ignition spark timing, air-fuel ratio, and amount of alcohol (e.g., ethanol) in the fuel.

Once the operating conditions are determined, humidity readings are generated in desired locations at 212 of routine 200 in FIG. 2. As depicted in FIG. 1, a humidity reading may be generated by a humidity sensor positioned in each of three locations. A first humidity sensor located in the intake manifold determines the water vapor concentration of the intake air. Since the first humidity sensor is positioned downstream of the point where exhaust gas from the EGR system enters the intake manifold, the humidity reading may be indicative of the water vapor concentration of a combination of ambient intake air and exhaust gas. During conditions when the EGR valve is closed and exhaust gas is not permitted to enter the intake manifold, the humidity generated in the intake manifold is indicative of the water vapor concentration of fresh air (e.g., ambient air) entering the engine.

A second humidity sensor located in the exhaust manifold determines the water vapor concentration of exhaust gas as it exits the combustion chamber. The second humidity sensor is located upstream of the point where exhaust gas enters the EGR system; thus, the second humidity reading is indicative of the water vapor concentration of the exhaust gas in the EGR system.

A third humidity sensor positioned outside of the engine determines the water vapor concentration of ambient air surrounding the vehicle. In some embodiments, the engine may not include a third humidity sensor as the ambient humidity may be detected by the first humidity sensor. Hereinafter, however, the description includes a humidity sensor since inclusion of the third humidity sensor may be advantageous for identifying degradation of the EGR valve and one or more of the plurality of humidity sensors, as will be described below.

Continuing with FIG. 2, at 214 of routine 200, a mass balance formula (e.g., conservation of mass) is applied to the humidity data generated at 212 to in order to determine an exhaust gas fraction. In particular, the mass balance formula may be applied to the intake air. For example, the humidity of the intake air ($H_{int}$) is a combination of the ambient humidity ($H_{amb}$) and the exhaust gas humidity ($H_{exh}$) when the EGR valve is open as the intake air consists of a fraction of exhaust gas from the EGR system ($f_{EGR}$) and a fraction of ambient air ($f_{amb}=1-f_{EGR}$). Thus, an equation of the form, $$H_{int}=f_{EGR}*H_{exh}+(1-f_{EGR})*H_{amb}, \quad (EQN. 1)$$

may be utilized to determine the fraction of EGR (exhaust gas from the EGR system) in the intake air.

At 216 of routine 200 in FIG. 2, an EGR amount is determined. The EGR amount is based on the exhaust gas fraction ($f_{EGR}$) determined from EQN. 1 and the mass air flow of intake air entering the combustion chamber. As can be seen from EQN. 1, the exhaust gas humidity generated from the humidity sensor located in the exhaust manifold is utilized to determine the EGR amount. The exhaust humidity may fluctuate due to a change in the air-fuel ratio and/or a change in the amount of alcohol in the fuel injected into the cylinder, such as when the engine is a flex fuel engine. Because the exhaust gas humidity is detected in the exhaust manifold, rather than estimated based on a stoichiometric air-fuel ratio or amount of alcohol in the fuel, the EGR amount may be more easily compensated for changes in the exhaust gas water vapor concentration.

Once the EGR amount is determined, desired engine operating parameters may be adjusted at 218 of routine 200 responsive to the EGR amount determined at 216. Such operating parameters may include ignition spark timing.

The fraction of burned gasses (e.g., exhaust gas in the intake air from the EGR system) in an engine cylinder affects the rate at which the air fuel mixture is combusted. As such, the spark timing may vary as a function of the EGR amount. Thus, ignition spark timing may be scheduled in order to maintain and/or increase fuel economy with an accurate indication of the EGR amount. As an example, in at least one condition, the ignition spark timing may be advanced in response to an EGR amount that is increasing (e.g., the EGR amount determined at 216 is greater than a previous indication of the EGR amount).

As described above, by generating an indication of humidity at a plurality of locations including at least a location in the intake manifold and a location in the exhaust manifold, an accurate indication of an exhaust gas recirculation amount may be generated despite the air-fuel ratio or the amount of alcohol in the fuel. Additionally, having a plurality of humidity sensors in a plurality of locations may provide a way to identify problems with the EGR system as well as the sensors themselves, as will be described with respect to FIGS. 3 and 4.

Figure 3:
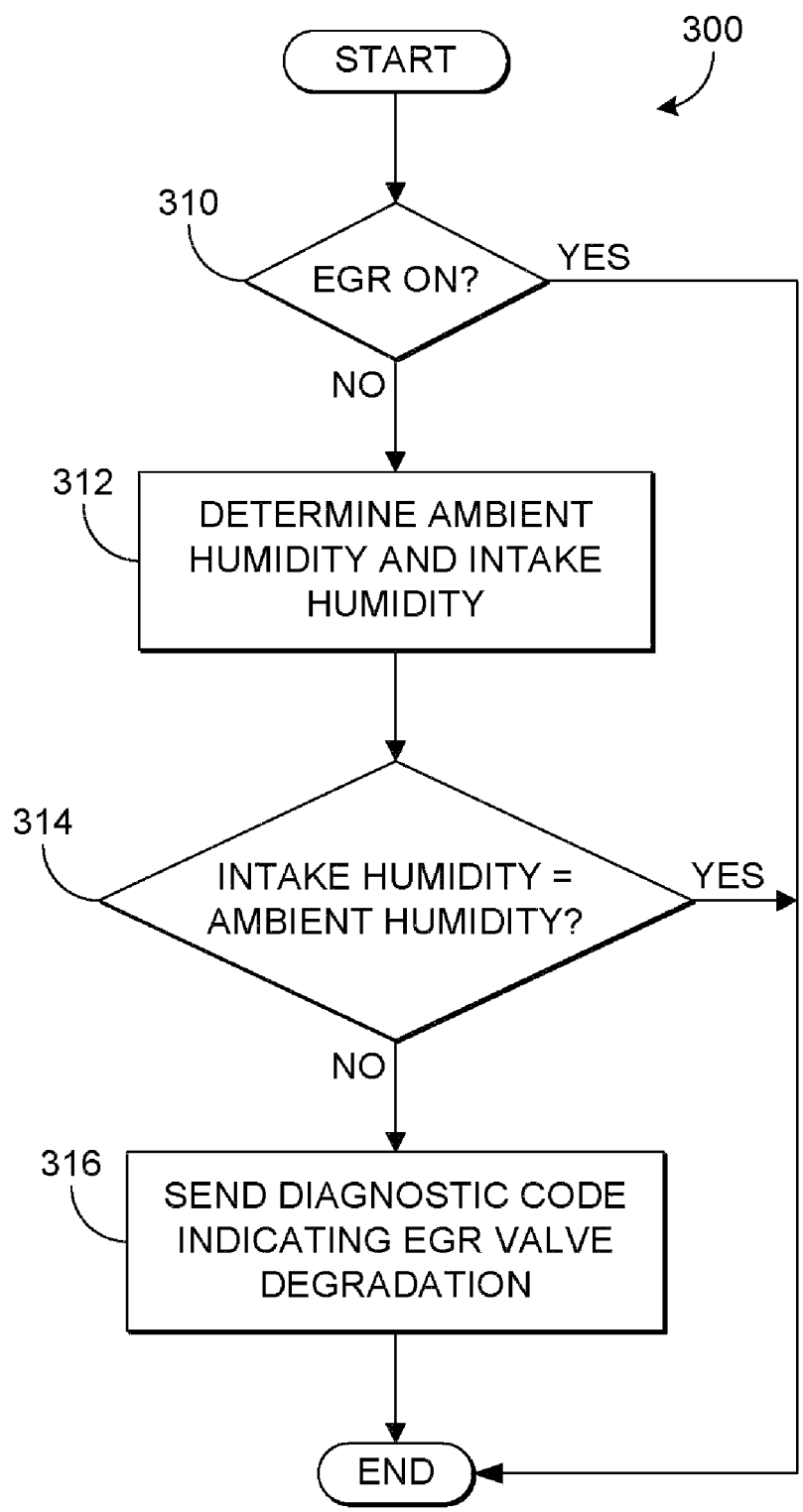
FIG. 3 shows a flow chart illustrating a routine for indication EGR valve degradation.

FIG. 3 shows a flow chart illustrating a routine 300 for indicating EGR valve degradation. Specifically, the routine determines a state of the EGR valve based on a first set of humidity readings generated outside of the engine and in the intake manifold under conditions in which the EGR valve is closed. Under such conditions, the intake humidity should equal the ambient humidity; thus, degradation of the EGR valve may be identified if the intake humidity does not equal the ambient humidity, or differs from it by more than a threshold amount.

At 310 of routine 300 in FIG. 3, it is determined if the EGR valve is in the open position (e.g., if the EGR is on), or is open greater than a minimum opening amount. When the EGR valve is open, exhaust gases are permitted to enter the intake manifold, thus altering the humidity in the intake manifold. For this reason, if the EGR valve is open, routine 300 ends.

If it is determined that the EGR valve is not open (e.g., the EGR valve is closed), routine 300 proceeds to 312 where the third humidity sensor generates an indication of the ambient humidity and the first humidity sensor generates an indication of the intake humidity. The ambient humidity and the intake humidity are compared at 314 of routine 300. As stated above, the intake humidity is substantially equal to the ambient humidity if the EGR valve is in the closed position. Therefore, if it is determined that the intake humidity is the substantially the same as the ambient humidity (e.g., the humidities differ by less than a threshold amount), the routine ends. If, however, the intake humidity differs greater than the threshold amount from the ambient humidity, the routine continues to 316.

At 316, exhaust gas recirculation valve degradation is identified. For example, a degradation of the EGR valve may cause the valve to leak and exhaust gas may inadvertently flow into the intake manifold. This may result in a change in the water vapor concentration in the intake manifold and the intake humidity will not equal the ambient humidity Likewise, the EGR valve may not open when commanded, or include additional restrictions due to valve coking. Thus, in some embodiments, degradation may be indicated via a diagnostic code sent to the control system. In other embodiments, a flag may be set to indicate EGR valve degradation.

Therefore, by generating an indication of the water vapor concentration in the intake manifold and an indication of the water vapor concentration outside of the engine during conditions in which the EGR valve is closed, it is possible to identify degradation of the EGR valve system.

Furthermore, based on a second set of humidity readings generated under selected operating conditions (as will be described below) it is possible to differentiate between EGR valve degradation and humidity sensor degradation. For example, during engine non-fueling conditions, if one of a plurality of humidity indications (e.g., ambient humidity, intake humidity, and exhaust humidity) differs from the others greater than a threshold amount, degradation of that sensor is indicated. Under non-fueling conditions, even if the EGR valve is degraded (e.g., inadvertently opened when commanded closed for the humidity sensor diagnostics), humidity sensor degradation may be identified via the second set of humidities, as the air being recirculated by the EGR system is substantially ambient air.

Figure 4:
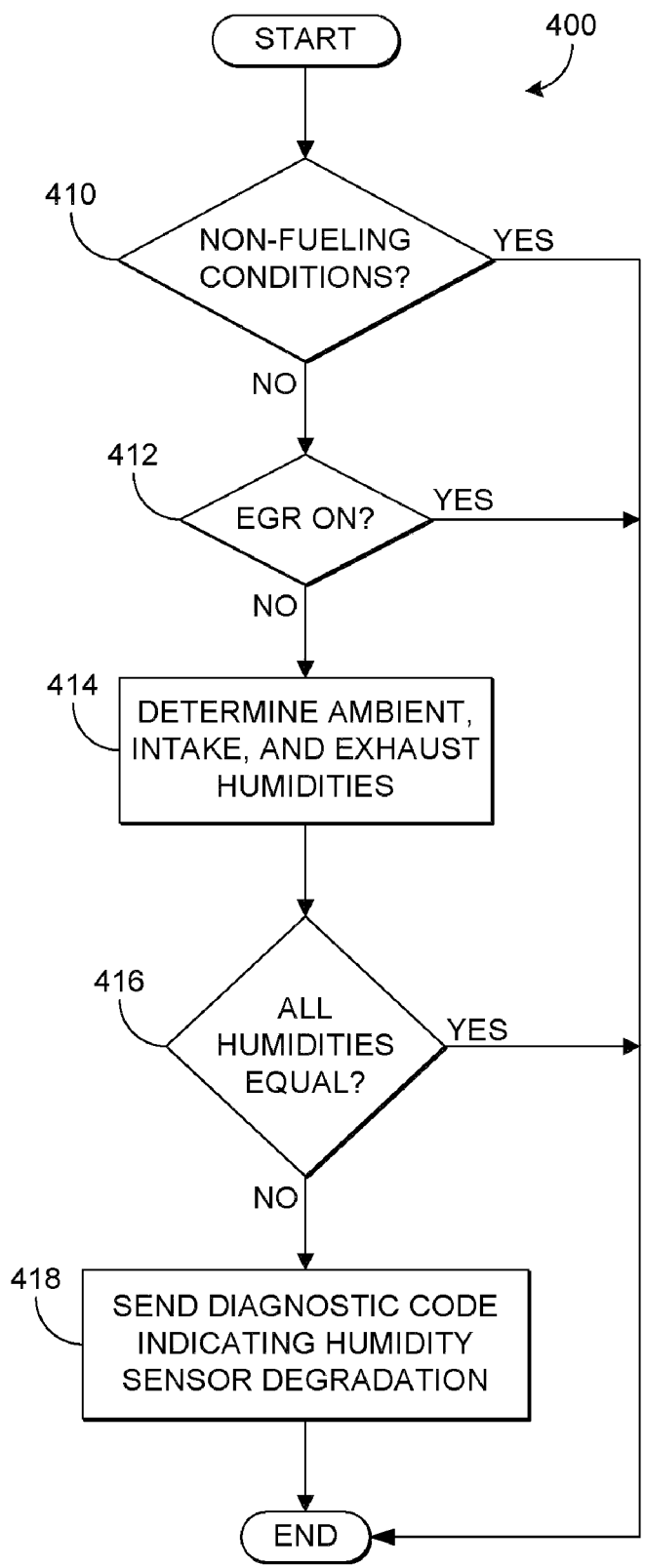
FIG. 4 shows a flow chart illustrating a routine for indicating humidity sensor degradation.

A flow chart illustrating a routine 400 for identifying humidity sensor degradation is shown in FIG. 4. Specifically, the routine determines degradation of the plurality of humidity sensors based on a second set of humidity readings generated outside of the engine and in the intake and exhaust manifolds under engine non-fueling conditions in which the EGR valve is closed. As explained in detail below, under conditions in which fuel is not injected in the cylinders and the EGR valve is closed, the humidity at each of the three locations should be substantially the same.

It is determined if the engine is under non-fueling conditions at 410 of routine 400. Non-fueling conditions include engine operating conditions in which the fuel supply is interrupted but the engine continues spinning and at least one intake valve and one exhaust valve (e.g., the intake valve and the exhaust valve of the same cylinder) are operating, such as deceleration fuel shut-off (DFSO). Thus, air is flowing through one or more cylinders, but fuel is not injected in the cylinders. Under non-fueling conditions, combustion is not carried out and ambient air may move through the cylinder from the intake manifold to the exhaust manifold. In this way, the second humidity sensor located in the exhaust manifold may receive ambient air on which humidity measurements may be performed. Further, in the case of EGR valve degradation, because ambient air is moved through the cylinder to the exhaust manifold, ambient air may also flow through the EGR system; thus, humidity measurements are not affected if, for example, the EGR valve is leaking, or inadvertently open when commanded closed.

If it is determined that the engine is not under non-fueling conditions at 410 (e.g., fuel is injected in one or more cylinders), the routine ends. On the other hand, if it is determined that the engine is under non-fueling conditions, routine 400 proceeds to 412 where it is determined if EGR is on (e.g., if the EGR valve is open). If the EGR valve is in the open position and exhaust gas is permitted to flow into the intake manifold, routine 400 ends.

In the case where the EGR valve is in the closed position and exhaust gas is not permitted to flow into the intake manifold, routine 400 of FIG. 4 continues to 414. At 414, the first humidity sensor generates a first humidity reading indicative of the water vapor concentration in the intake manifold, the second humidity sensor generates a second humidity reading indicative of the water vapor concentration in the exhaust manifold, and the third humidity sensor generates a third humidity reading indicative of the water concentration outside of the engine.

At 416 of routine 400, it is determined if the humidity readings generated at 414 are equal (e.g., if the humidity of the intake manifold is equal to the humidity of the exhaust manifold and the humidity of the ambient air). Because the engine is operating under non-fueling conditions and the EGR valve is closed, combustion is not carried out and the exhaust humidity should be substantially equal to the intake humidity. Further, because the EGR valve is closed, the intake humidity should be the substantially the same as the ambient humidity. Thus, if all three of the humidity readings are substantially equal (or do not differ by more than a threshold amount), routine 400 ends.

Degradation of one or more of the plurality of humidity sensors may be identified via routine 400. For example, if the intake humidity is substantially equal to the ambient humidity and the exhaust humidity differs greater than a threshold amount from them, there may be degradation of the second humidity sensor positioned in the exhaust manifold. As another example, if the intake humidity is substantially equal to the exhaust humidity but the ambient humidity is differs greater than a threshold amount from them, there may be degradation of the ambient humidity sensor located outside of the engine. As a further example, if the exhaust humidity is substantially the same as the ambient humidity and the intake humidity differs greater than a threshold amount from the other two, there may be degradation of the intake humidity sensor positioned in the intake manifold.

In this way, it is possible to differentiate which among a plurality of humidity sensors is degraded based on a difference greater than a threshold amount between the humidity reading of one sensor and humidity readings of the other sensors, under selected operating conditions.

At 418 of routine 400 in FIG. 4, humidity sensor degradation is indicated and a signal may be sent to the vehicle operator. In some embodiments, sensor degradation may be indicated via a diagnostic code sent to the control system indicating which of the plurality of humidity sensors is degraded. In other embodiments, a flag may be set to indicate sensor degradation. These codes and flags indicating degradation of one or more of the plurality of humidity sensors may be accumulated prior to alerting the vehicle operator.

As described herein, a plurality of humidity sensors positioned in a plurality of locations, including at least a first sensor in the intake manifold and a second sensor in the exhaust manifold, may be used to generate an accurate indication of an exhaust gas recirculation amount. By including a humidity sensor in the exhaust manifold, and thus an indication of the exhaust gas water vapor concentration, an accurate exhaust gas recirculation amount may be determined regardless of the air-fuel ratio or amount of alcohol in the fuel. In this way, various engine operating parameters may be adjusted based on the exhaust gas recirculation amount in order to maintain or decrease emissions and maintain or increase fuel economy and driveability of the vehicle.

Further, the plurality of humidity sensors may be used to detect exhaust gas recirculation valve degradation as well as humidity sensor degradation based on the generated humidities and engine operating conditions such as non-fueling conditions and/or when the EGR valve is closed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine in a vehicle during engine operation, the engine having an exhaust passage and an exhaust gas recirculation system, the method comprising:
    adjusting an engine operating parameter based on an exhaust gas recirculation amount, the exhaust gas recirculation amount based on a first humidity and a second humidity, the first humidity generated from a first humidity sensor at a first location in an intake manifold of the engine, the second humidity generated from a second humidity sensor at a second location in an exhaust manifold of the engine.

2. The method of claim 1 wherein the vehicle further comprises a third humidity sensor located outside of the engine for generating an ambient humidity, the method further comprising determining the exhaust gas recirculation amount based on the third humidity sensor.

3. The method of claim 2 wherein determining the exhaust gas recirculation amount is based on a balance of an ambient water mass and an exhaust water mass in the intake manifold.

4. The method of claim 1 wherein the engine operating parameter includes spark timing.

5. The method of claim 1 wherein, in at least one condition, spark timing is advanced in response to the exhaust gas recirculation amount increasing.

6. The method of claim 1 wherein an air-fuel ratio of the engine is variable.

7. The method of claim 1 wherein the engine is a flex fuel engine.

8. A method of controlling an engine in a vehicle during engine operation, the engine having an exhaust gas recirculation system and an exhaust system, the method comprising:
    during engine non-fueling conditions, generating an intake humidity via a first sensor and an exhaust humidity via a second sensor, the second sensor positioned in an exhaust gas flow of the engine, the exhaust gas flow directed to a tailpipe of the exhaust system;
    during engine fueling conditions in which exhaust gas recirculation is off, generating an intake humidity via the first sensor; and
    identifying degradation based on the generated humidities.

9. The method of claim 8 wherein engine non-fueling conditions include deceleration fuel shut off.

10. The method of claim 8 wherein the vehicle further comprises a third humidity sensor located outside of the engine for generating an ambient humidity, the method further comprising identifying degradation based on the third humidity sensor.

11. The method of claim 8 wherein degradation is identified when the intake humidity and ambient humidity differ greater than a threshold amount.

12. The method of claim 11 wherein degradation includes exhaust gas recirculation valve degradation.

13. The method of claim 9 wherein degradation is identified when the intake humidity, the exhaust humidity, and the ambient humidity generated during non-fueling conditions in which exhaust gas recirculation is off differ greater than a threshold amount.

14. The method of claim 13 wherein degradation includes humidity sensor degradation.

15. The method of claim 8 wherein identifying degradation includes differentiating between EGR valve degradation and humidity sensor degradation based on the generated humidities.

16. A system for an engine in a vehicle, the system comprising:
- an exhaust gas recirculation system;
- at least two humidity sensors coupled to the engine, a first sensor being located in an intake manifold and a second sensor being located in an exhaust manifold upstream of the exhaust gas recirculation system; and
- a control system including a computer readable storage medium, the medium including instructions thereon, the control system receiving communication from the humidity sensors, the medium comprising:
- instructions for identifying an amount of exhaust gas recirculation, where the identified exhaust gas recirculation amount is based on humidity readings generated by the at least two humidity sensors, as well as an ambient humidity, and instructions for adjusting an engine operating condition in response to the identified exhaust gas recirculation amount.

17. The system of claim 16 wherein a third sensor is located outside of the engine for generating the ambient humidity.

18. The system of claim 16 further comprising instructions for identifying humidity sensor degradation based on humidity readings generated during engine non-fueling conditions in which an exhaust gas recirculation valve is closed.

19. The system of claim 16 further comprising instructions for identifying exhaust gas recirculation valve degradation based on humidity readings generated during conditions in which an exhaust gas recirculation valve is closed.

20. The system of claim 18 wherein identifying humidity sensor degradation includes differentiating which among the at least two humidity sensors is degraded based on a difference greater than a threshold amount between the humidity reading of one sensor and the humidity readings of the other sensors.

* * * * *